United States Patent Office  3,844,998
Patented Oct. 29, 1974

3,844,998
AQUEOUS COATING COMPOSITION OF AN EPOXY ESTER RESIN AND A WATER-DISPERSIBLE CROSS-LINKING AGENT
Jeffery J. Jeffery, Davison, and Aloysius N. Walus, Flint, Mich., assignors to E. I. du Pont de Nemours and Company, Wilmington, Del.
No Drawing. Filed Dec. 8, 1972, Ser. No. 313,411
Int. Cl. C08g 45/10, 51/24
U.S. Cl. 260—29.4 R        8 Claims

ABSTRACT OF THE DISCLOSURE

The coating composition of this invention contains a polymeric binder in an aqueous medium in which the polymeric binder comprises the following components:

(A) an epoxy ester resin of an epoxy hydroxy polyether resin chain-extended with a diphenol such as p-,p-isopropylidenediphenol and reacted with secondary amine and then esterified with trimellitic anhydride; and
(B) a water-dispersable crosslinking agent such as hexakis(methoxymethyl)melamine, benzoguanamine formaldehyde or methylated urea formaldehyde;

the novel coating composition is particularly useful as a high quality primer for steel substrates which does not require sealer coats and is used for automobile and truck bodies.

BACKGROUND OF THE INVENTION

This invention relates to a coating composition and in particular to a high quality water-based primer composition.

Primers are widely used in the automobile and truck manufacturing industry and applied over steel substrates to form a smooth surface over which acrylic lacquers, acrylic dispersion lacquers or acrylic enamel topcoats are applied. Acrylic lacquers and acrylic dispersion lacquers often require a sealer coat over the primer composition to form an exceptionally smooth substrate over which these topcoat composition are then applied. Typical primer compositions of epoxy esters are shown in Swanson and Walus U.S. Pat. 3,272,647, issued Sept. 13, 1966; epoxy resin compositions are shown in Jeffery et al. U.S. Pat. 3,505,269, issued Apr. 7, 1970 and in Rohrbacher U.S. Pat. 3,509,086, issued Apr. 28, 1970. These prior art compositions are excellent and form high quality finishes.

However, the automobile and truck manufacturing industry is in need of finishes which are non-airpolluting and in particular is in need of high quality water-based primer compositions that have excellent adhesion to treated and untreated steel substrates, excellent corrosion resistance and provide a surface to which the standard acrylic lacquer and dispersion lacquer topcoats and water-based acrylic topcoats and also acrylic powder coated compositions can be applied without the use of an intermediate sealer coat. The novel aqueous primer composition of this invention has excellent adhesion to treated and untreated metal substrates and good corrosion and chip resistance. Any of the aforementioned conventional acrylic topcoats, water-based acrylic topcoats and powder coatings can be applied over the metal primer and provide an excellent finish for automobile and truck bodies.

SUMMARY OF THE INVENTION

The primer composition of this invention comprises about 2–50% by weight of a binder in an aqueous medium which can contain up to 20% by weight of solvent for the binder; wherein the binder consists essentially of (A) 75–98% by weight, based on the weight of the binder, of an epoxy ester resin having a weight average molecular weight of about 5,000–50,000, an acid number of about 20–120 and consists essentially of the reaction product of (1) an epoxy resin of the formula

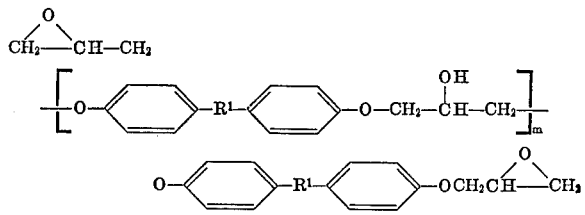

where $R^1$ is an alkylene group of 1–4 carbon atoms and $m$ is a positive integer that is sufficiently large to provide a molecular weight of 400–4000; and
(2) a diphenol of the formula

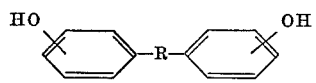

where R is an alkylene group having 1–4 carbon atoms, wherein the residual epoxy groups of the reaction product are reacted with a secondary amine, and
(3) esterifying the reaction product with trimellitic anhydride to form the above epoxy ester resin,
(B) 2–25% by weight, based on the weight of the binder of a water-dispersible cross-linking agent such as hexakis(methoxymethyl)melamine, benzoguanamine formaldehyde methylated urea formaldehyde and the like, wherein the binder is neutralized with ammonium hydroxide or an amine and the resulting composition has a pH of about 7–9.

DESCRIPTION OF THE INVENTION

The novel coating composition of this invention preferably has a polymeric binder content of about 5–25% by weight, and the binder preferably comprises 90–97% by weight of the epoxy ester resin and 3–10% by weight of the water-dispersible crosslinking resin. The novel composition can be clear or pigmented and if pigmented contains about 0.1–30% by weight pigment.

The novel composition has excellent physical properties such as good adhesion to bare or treated metal substrates, chip resistance, crack and mar resistance and good corrosion resistance. The composition can be used as a primer over bare or treated metal substrates and is of a sufficient high quality that sealer compositions are not required over the primed metal surface. Acrylic enamels, acrylic lacquers, acrylic dispersion lacquers, water-based acrylic lacquers or enamels or acrylic powder coating compositions can be applied directly over the novel primer of this invention to form a high quality attractive finish for automobiles and trucks.

Also, the novel coating composition of this invention can be pigmented and used as a topcoating for appliances such as refrigerators, stoves, washers, driers and the like.

The epoxy ester resin utilized in preparing the novel coating composition of this invention is the reaction product of a diphenol and an epoxy resin which is then reacted with a secondary amine to terminate any residual epoxy groups. Then this product is esterified with trimellitic anhydride to form an epoxy ester resin that has an acid number of about 20–120. To render the epoxy ester resin water dispersible or water soluble, it is neutralized with ammonium hydroxide or an amine to a pH of about 7–9.

The diphenol utilized to prepare the epoxy ester resin is of the formula

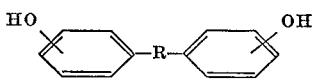

where R is an alkylene group having 1–4 carbon atoms. One preferred diphenol is p,p-isopropylidenediphenol commonly known is bisphenol A and another is p-,p-ethylenediphenol which is commonly known as bisphenol F.

The epoxy resin used to prepare the epoxy ester has the following structural formula

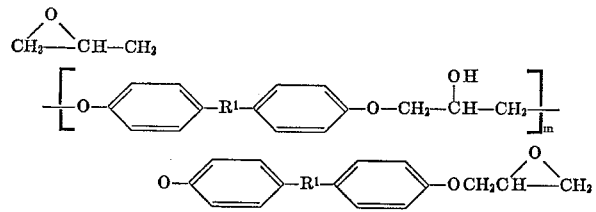

where $R^1$ is an alkalene group of 1–4 carbon atoms and $m$ is a positive integer sufficiently large to provide a weight average molecular weight of about 400–4000. One preferred epoxy resin is the reaction product of epichlorohydrin and bisphenol A which provides a resin in which $R^1$ is isopropylidene. Another useful epoxy resin is the reaction product of epichlorohydrin and bisphenol F which provides a resin in which $R^1$ is methylene.

The secondary amine used to terminate the residual epoxy groups of the reaction product of the epoxy resin and the diphenol preferably is a dialkyl diamine, such as dimethyl amine, diethyl amine, ethylmethyl amine, dipropyl amine, dibutyl amine and the like. Diethyl amine is preferred.

Trimellitic anhydride or an equivalent thereof is used to prepare the epoxy ester resin from the reaction product of the diphenol and the epoxy resin. The reaction of the secondary amine with the residual epoxy groups of the reaction product of the epoxy resin and the diphenol prevents premature cross-linking and gellation and the amine catalyzes the esterification reaction with the trimellitic anhydride.

The resulting epoxy ester resin has a weight average molecular weight of about 5,000 to 50,000 and preferably 6,000 to 12,000. The polymer has an acid number of 20–120, preferably 20 to 50.

To form a dispersible epoxy ester resin, the polymer is at least partially neutralized with ammonium hydroxide or an amine, preferably a water-soluble amine, and then gradually dispersed in water. Typical water-soluble amines that can be used are primary amines, secondary amines, tertiary amines, polyamines, hydroxy amines, such as ethanol amine, diethanol amine, triethanol amine, dimethylethanol amine, N-methylethanol amine, N,N-diethylethanol amine, N-aminoethanol amine, N-methyldiethanol amine, monoisopropanol amine, diisopropanol amine, triisopropanol amine, hydroxy amine, butanol amine, hexanol amine, methyldiethanol amine, ethylene diamine, diethylene triamine, N-N-dimethylbenzyl amine, diethylene tetramine, hexamethylene tetramine, triethyl amine, and the like. Preferably, diethylethanol amine is used. The aforementioned amines can also be utilized to adjust the pH of the resulting primer composition within the range of 7–9, and preferably, 7.0–8.0.

A water-dispersible or water-soluble cross-linking agent is blended with the aforementioned epoxy ester resin to form a novel coating composition. Typical water-dispersible cross-linking agents that can be used are hexakis(methoxymethyl)melamine, partially methylated melamine formaldehyde, butylated melamine formaldehyde, benzoguanamine formaldehyde, methylated urea formaldehyde, urea formaldehyde and the like. One useful resin is an anionic partially methylated melamine formaldehyde resin modified with hydroxy acids and sold under the designation XM-1125.

Pigments can be used in the novel primer composition of this invention in the amounts of 0.1–30% by weight, and preferably, about 10–25% by weight of pigment is used. Preferably, the pigment is formed into a mill base using conventional techniques and then blended with the composition. Examples of the great variety of pigments which are used in the novel primer composition of this invention are metallic oxides, such as titanium dioxide, iron oxide, zinc oxide, and the like, metal hydroxides, metal flakes, such as aluminum flake, metal powders, chromates, such as lead chromate, sulfides, sulfates, silicates such as calcium silicate, magnesium silicate, aluminum silicate, carbonates, carbon black, silica, talc, china clay, organic reds, organic maroons, and other organic dyes and lakes.

The novel primer compositions of this invention can be applied to a variety of substrates, for example, treated and untreated autobody steel substrates, unprimed or primed metal substrates, wood, glass, plastics, such as polypropylene, styrene, copolymers of styrene and the like, by any of the usual application methods, such as spraying, electrostatic spraying, electrocoating, dipping, brushing, flow coating and the like. These coatings are baked at about 110–200° C. for about 10–60 minutes. The resulting coating is about 0.1–3 mils thick, preferably 0.1–1 mils thick and can be buffed or sanded in accordance with conventional techniques, if desired, to improve smoothness.

In particular, the novel primer composition of this invention has excellent adhesion to bare or treated metals such as autobody steel. Also, in addition to its use as a sealerless primer, the novel composition can be a highly pigmented coating or can be used as a clear sealer coating. When used as a primer or a primer composition, topcoats of all types of lacquers and enamels have excellent adherence to the novel coating composition of this invention which provides a finish that has a good appearance and has excellent mar, chip, scratch and corrosion resistance.

The following Examples illustrate this invention. The parts and percentages are by weight unless otherwise specified.

EXAMPLE 1

An epoxy ester resin solution is prepared as follows:

| | Parts by weight |
|---|---|
| Portion 1: | |
| Epoxy resin ("Epon" 829*) | 1160.00 |
| Bisphenol A (p,p-isopropylidenediphenol) | 614.00 |
| Diethyl phthalate | 560.00 |
| Cyclohexanone | 200.00 |
| Acetone | 20.00 |
| Portion 2—Acetone | 300.00 |
| Portion 3—Diethylamine | 26.00 |
| Portion 4—Trimellitic anhydride | 240.00 |
| Portion 5—N,N-dimethylbenzylamine | 6.00 |
| Portion 6—Butanol | 510.00 |
| Portion 7—Isopropanol | 364.00 |
| Total | 4000.00 |

*"Epon" 829 has the following structural formula

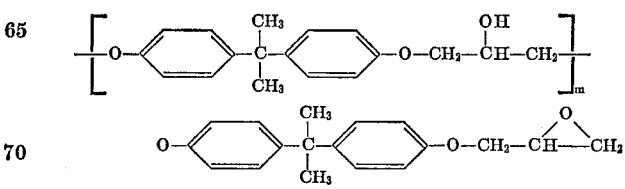

$m$ is a positive integer sufficiently large to provide a Gardner Holdt viscosity measured on undiluted resin at 25° C. of 100–160 poises and has an epoxy equivalent of 185–192. The epoxy equivalent is the grams of resin containing 1-gram equivalent of epoxide.

Portion 1 is premixed and charged into a reaction vessel equipped with a stirrer, a heating mantel, a thermometer and a reflux condenser and the ingredients are slowly heated to the reflux temperature of the reaction mixture and then refluxed for about two hours. Portion 2 is slowly added over a 30-minute period then the temperature of the reaction mixture is reduced to about 90° C. Portion 3 is then added while maintaining the reaction mixture at about 90° C. for about 30 minutes and then Portion 4 is added and then Portion 5 is added and the reaction mixture is brought to a slight reflux at about 90° C. and held at this temperature for about 45 minutes. Then Portions 6 and 7 are added to dilute the mixture and the reaction mixture is allowed to cool.

The resulting polymer solution has a polymer solids content of about 52% and a Gardner Holdt viscosity measured at 25° C. of about $Z^6$ and the polymer has an acid number of about 65.

A cross-linkable composition is prepared by blending hexakis(methoxymethyl)melamine resin with the above prepared composition in a resin ratio of 95 parts of the above prepared polymer solution to 5 parts of the hexakis(methoxymethyl)melamine resin. The above solution is neutralized with dimethylethanol amine to a pH of about 7–9 and then reduced with water to a spray viscosity of about 18 seconds measured in a No. 1 Fisher Cup at 25° C. The composition is then sprayed onto the following steel panels: an untreated steel panel and a phosphatized steel panel. After the composition is sprayed onto the steel panel, it is allowed to air dry and then baked at 190° C. for 30 minutes. The resulting coating is about 0.25–0.50 mils in thickness and in each case has excellent adhesion to the steel panel.

A standard automotive acrylic lacquer is then applied over the above primed steel panels and then baked at about 150° C. for about 30 minutes. Each of the above steel panels have an excellent appearance and exhibit excellent chip resistance and good corrosion resistance which indicates that the primer composition has excellent adherence to the substrate and to the acrylic topcoat.

EXAMPLE 2

An epoxy ester polymer is prepared as follows:

| Portion 1: | Parts by weight |
|---|---|
| Epoxy resin ("Epon" 1004*) | 1659.00 |
| Bisphenol A (described in Example 1) | 145.40 |
| Diethyl phthalate | 560.00 |
| Cyclohexanone | 200.00 |
| Acetone | 20.00 |
| Portion 2—Acetone | 300.00 |
| Portion 3—Diethylamine | 15.60 |
| Portion 4—Trimellitic anhydride | 180.00 |
| Portion 5—N,N-dimethylbenzylamine | 6.00 |
| Portion 6—Butanol | 507.00 |
| Total | 3593.00 |

*"Epon" 1004 has the same structural formula as set forth in Example 1 except that $m$ is a positive integer sufficiently large to provide a Gardner Holdt viscosity measured at 40% polymer solids in diethylene glycol monobutylether at 25° C. of Q–U and an epoxide equivalent of 875–1000.

Portion 1 is premixed and charged into a reaction vessel equipped with a stirrer, a heating mantel, a thermometer and a reflux condenser and the ingredients are slowly heated to the reflux temperature and maintained at this temperature (about 177° C. for about 2 hours). Then Portion 2 is added to the reaction mixture to lower the temperature to 85–90° C. Portion 3 is then added and the reaction mixture is held at a slight reflux temperature of about 90° C. for about 30 minutes. Then Portion 4 is added, and then Portion 5 is added and the reaction mixture is maintained at its reflux temperature for about 1½ hours. Portion 6 is added and the reaction mixture is cooled to room temperature.

The resulting polymer solution has a polymer solids content of about 56% and a Gardner Holdt viscosity measured at 25° C. of $Z^6$ and the polymer has an acid number of about 52. The above solution is then neutralized with dimethylethanol amine to a pH of about 7.0–8.0.

The following coating compositions are prepared: (all parts are on a weight basis)

| Coating composition | Neutralized polymer solution prepared above | Hexakis-(methoxymethyl) melamine | Benzoguanamine formaldehyde resin |
|---|---|---|---|
| 1 | 97 | 3 | |
| 2 | 95 | 5 | |
| 3 | 97 | | 3 |
| 4 | 95 | | 5 |

The above constituents are blended together to form coating compositions 1–4. Each of the coating compositions is reduced to a spray viscosity with water as shown in Example 1. Each of the coating compositions is applied to untreated steel panels and phosphatized steel panels and air dried and baked as described in Example 1. A standard acrylic lacquer is applied to each one of the primed steel panels and baked for 30 minutes at 150° C. The resulting panels have excellent chip resistance and the topcoat has excellent adhesion to the primer, indicating that the above-prepared finishes are of a high quality.

A second set of primed steel panels is coated with the above compositions 1–4 and each is air dried and baked as above. An aqueous acrylic lacquer dispersion is applied to the panels and baked as above. The resulting finish has excellent adhesion to the substrate and has good chip resistance.

EXAMPLE 3

An epoxy ester solution is prepared as follows:

| Portion 1: | Parts by weight |
|---|---|
| Epoxy resin ("Epon" 1004 described in Example 2) | 862.30 |
| Diethylene glycol diethyl ether | 310.00 |
| Portion 2—Bisphenol A (described in Example 1) | 75.60 |
| Portion 3: | |
| N,N-Dimethyl benzylamine | 3.00 |
| Acetone | 6.00 |
| Portion 4—Acetone | 30.00 |
| Portion 5: | |
| Acetone | 25.00 |
| Diethylamine | 16.10 |
| Portion 6—Acetone | 50.00 |
| Portion 7—Trimellitic anhydride | 46.00 |
| Portion 8—Ethylene glycol monobutyl ether | 314.00 |
| Portion 9: | |
| Dimethylethanol amine | 43.00 |
| Deionized water | 419.00 |
| Portion 10—Deionized water | 1500.00 |
| Total | 3700.00 |

Portion 1 is premixed and charged into a reaction vessel equipped with a stirrer, a heating mantel, a thermometer and a reflux condenser and the ingredients are slowly heated. Then Portion 2 and Portion 3 are added in order and the reaction mixture is heated to 110° C. until the ingredients melt and then the reaction mixture is heated to its reflux temperature and held at about 175° for 2 hours. Then Portion 4 is added over a 12-minute period and then Portion 5 is added over a 13-minute period and the reaction mixture is again heated to its reflux temperature and held at this temperature for about 45 minutes. Portion 6 is added over a 10 minute period and Portion 7 is added and the reaction mixture is heated to about 90° C. for about 2 hours. Portion 8 and then Portion 9 are added and mixed with the reaction mixture. Portion 10 is added and the reaction mixture is held at about 60° C. and thoroughly agitated for about 30 minutes.

The resulting polymer dispersion has a solids content of about 26% and a Gardner Holdt viscosity measured at 25° C. of A$^{-1}$ and has a pH of 8.7. The polymer has an acid number of 31.6. The dispersion weighs 8.67 lb./gal.

A mill base is prepared as follows:

| | Parts by weight |
|---|---|
| Epoxy ester resin solution (prepared above) | 1000.00 |
| Deionized water | 300.00 |
| Deionized water | 50.00 |
| Barytes pigment (low micron barytes) | 897.00 |
| Aluminum silicate pigment | 335.00 |
| Carbon black pigment | 17.00 |
| Titanium dioxide pigment | 401.00 |
| Total | 3000.00 |

The above ingredients are charged into a steel ball mill in the order given and ground for 16 hours to a fineness of 0.8 mls. The resulting mill base has a 64% solids content.

The above-prepared mill base is blended with the epoxy ester resin solution to form Mill Base A as follows:

| | Parts by weight |
|---|---|
| Mill base (prepared above) | 2070.00 |
| Epoxy ester solution (prepared above) | 207.00 |
| Total | 2277.00 |

The above ingredients are thoroughly blended together to form Mill Base A that contains 50% pigment and has a total solids content of 60.6%.

The following primer compositions A–K are prepared as shown in the Table. Each of the primer compositions is reduced to a spray viscosity by diluting the composition with water and then the composition is sprayed over a phosphatized steel panel and baked for 45 minutes at 165° C.

These primed panels are tested for saponification resistance for 1 week and for 2 weeks. The panels are immersed in a 0.1N NaOH solution, held at about 35° C. and removed once per week and examined for paint removal and for blistering. The panels are rated from 10 to 0 with 10 being a perfect rating and below 7 being an unacceptable rating.

A second set of steel panels is prepared by applying each of the primer compositions A–K on separate steel panels and baking these compositions for about 45 minutes at 165° C. providing a coating of about 0.7 mil in thickness. To each of these primed panels an acrylic lacquer topcoat is applied using conventional spraying techniques. The panels are then baked at the times and temperatures indicated in the Table, and the chip resistance and water soak resistance of the panels is checked. Then the results of these tests are indicated in the Table.

In the chip resistance test, the panels are chilled to −18° C. and then stones under 80 lb./sq. in. air pressure are thrown against the panels and the panels are rated for chip resistance. A rating system of 0–10 is used where 10 indicates very slight or no chipping on the panel and where 0 indicates substantial portion of the panels has been chipped away.

In the water soak test, the panels are immersed in deionized water, held at 40° C. for 96 hours and then removed and examined for paint adhesion to the substrate and for blistering. The panels are rated from 10 to 0 with 10 being perfect and below 7 being an unacceptable rating.

The above compositions A–K are of the high quality as indicated by the above tests and have excellent adhesion to the substrate and also to the acrylic topcoat.

TABLE

| | A | B | C | D | E | F | G | H | I | J | K |
|---|---|---|---|---|---|---|---|---|---|---|---|
| Epoxy ester resin solution (prepared above) | 168.00 | 164.00 | 156.00 | 168.00 | 165.00 | 123.00 | 91.00 | 157.00 | 173.80 | 173.00 | 170.00 |
| Mill Base A (prepared above) | 126.00 | 128.00 | 132.00 | 127.00 | 129.00 | 171.00 | 204.00 | 133.00 | 123.70 | 124.00 | 125.00 |
| "Resimine" X-970 (methylated urea formaldehyde) | 6.00 | 8.00 | 12.00 | | | | | | | | |
| "Resimine" X-980 (methylated urea formaldehyde) | | | | 5.00 | 6.00 | 6.00 | 5.00 | 10.00 | | | |
| Methylated urea formaldehyde solution (80% solids) | | | | | | | | | 2.50 | 3.00 | 5.00 |
| Deionized water | 50.00 | 50.00 | 50.00 | 50.00 | 50.00 | 50.00 | 50.00 | 50.00 | 50.00 | 50.00 | 50.00 |
| Total | 350.00 | 350.00 | 350.00 | 350.00 | 350.00 | 350.00 | 350.00 | 350.00 | 350.00 | 350.00 | 350.00 |
| Pigment/binder ratio | 100/100 | 100/100 | 100/100 | 100/100 | 100/100 | 150/100 | 200/100 | 100/100 | 100/100 | 100/100 | 100/100 |
| Primer film thickness over phosphatized steel (mils) | 0.70 | 0.70 | 0.70 | 0.70 | 0.70 | 0.80 | 0.80 | 0.70 | 0.80 | 0.70 | 0.70 |
| Saponification resistance (baked 45 minutes at 165° C.): | | | | | | | | | | | |
| One week | 8A | 8A | 7B | 8A | 8A | (¹) | (¹) | 7B | 7B | 7B | 7B |
| Two weeks | 8B | 8B | 9D | 8D | 8C | (¹) | (¹) | 9D | 8C | 8C | 8B |
| 0° C., chip resistance—Acrylic lacquer topcoat 2.2 mils thick: | | | | | | | | | | | |
| Baked 45 min. at 165° C | 7.00 | 7.00 | 7.00+ | 7.00 | 7.00+ | 6.00 | 6.00 | 7.00 | 6.00 | 6.00 | 7.00 |
| Baked 45 min. at 190° C | 8.00 | 8.00 | 8.00 | 8.00 | 8.00+ | 7.00 | 8.00 | 8.00 | 7.00 | 7.00 | 7.00 |
| Water soak resistance (96 hrs.), topcoat baked 45 min. at 165° C.: | | | | | | | | | | | |
| Tape adhesion | 10.00 | 9.00 | 8.00 | 9.00 | 9.00 | 8.00 | 8.00 | 7.00 | 9.00 | 9.00 | 7.00 |
| Blisters | None | None | None | None | None | None | None | None | None | None | None |

¹ Acceptable.

The invention claimed is:

1. A coating composition comprising about 2–50% by weight of a binder in an aqueous medium comprising up to about 20% by weight of a solvent for the binder; wherein the binder consists essenitally of (A) 75–98% by weight, based on the weight of the binder, of an epoxy ester resin having a weight average molecular weight of about 5,000–50,000 and an acid number of about 20–120 and consisting essentially of the reaction product of (1) an epoxy resin of the formula $$CH_2\!\!-\!\!\!\overset{O}{\underset{\diagup\diagdown}{}}\!\!\!CH\!-\!CH_2\!-\!\!\left[\!O\!-\!\!\left\langle\!\!\!\bigcirc\!\!\!\right\rangle\!\!-\!R^1\!-\!\!\left\langle\!\!\!\bigcirc\!\!\!\right\rangle\!\!-\!O\!-\!CH_2\!-\!\overset{OH}{\underset{|}{C}H}\!-\!CH_2\!-\!\right]_m$$
$$O\!-\!\!\left\langle\!\!\!\bigcirc\!\!\!\right\rangle\!\!-\!R^1\!-\!\!\left\langle\!\!\!\bigcirc\!\!\!\right\rangle\!\!-\!OCH_2CH\!\!-\!\!\!\overset{O}{\underset{\diagup\diagdown}{}}\!\!\!CH_2$$

wherein R¹ is an alkylene group of 1–4 carbon atoms or an alkylidene group of 3 carbon atoms and $m$ is a positive integer sufficiently large to provide a molecular weight average of about 400–4000; and (2) a diphenol of the formula

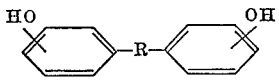

where R is an alkylene group having 1–4 carbon atoms, or an alkylidene group of 3 carbon atoms wherein the residual epoxy groups of the reaction product are reacted with a secondary amine and (3) esterifying the reaction product with trimellitic anhydride to form an epoxy ester resin; and (B) 2–25% by weight, based on the weight of the binder of a water-dispersible crosslinking agent selected from the group consisting of hexakis(methoxymethyl)melamine, partially methylated melamine formaldehyde, butylated melamine formaldehyde, benzoguanamine formaldehyde and methylated urea formaldehyde;

wherein the binder is neutralized with ammonium hydroxide or an amine and the resulting coating composition has a pH of about 7–9.

2. The coating composition of Claim 1 containing 0.1–30% by weight of pigment.

3. The coating composition of Claim 1 consisting essentially of 90–97% by weight of the epoxy ester resin and correspondingly 3–10% by weight of the water-dispersible crosslinking resin.

4. The coating composition of Claim 3 in which R and $R^1$ are isopropylidene.

5. The coating composition of Claim 4 in which the crosslinking agent is hexakis(methoxymethyl)melamine.

6. The coating composition of Claim 5 in which the pigment is a blend of barytes pigment, aluminum silicate pigment, carbon black pigment, and titanium dioxide pigment.

7. The coating composition of Claim 3 in which the crosslinking agent is a methylated urea formaldehyde resin.

8. The coating composition of Claim 1 containing 5–25% by weight of a polymeric binder and correspondingly 75–95% by weight of water and up to 20% by weight of a solvent for the binder; wherein the binder consists essentially of (A) 90–97% by weight, based on the weight of the binder, of an epoxy ester resin having a weight average molecular weight of about 6,000 to 12,000 and an acid number of 20 to 50, and consists essentially of the reaction product of (1) an epoxy resin of the formula

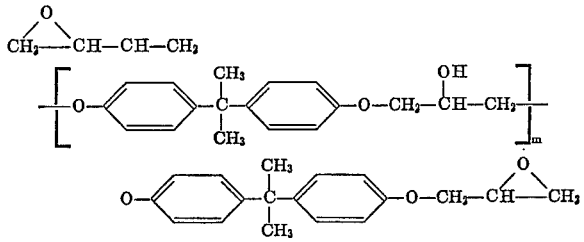

wherein $m$ is a positive integer sufficiently large to produce a weight average molecular weight of about 400–4000; and (2) p,p-isopropylidenediphenol, wherein the residual epoxy groups of the reaction product are reacted with diethylamine and (3) esterifying the reaction product with trimellitic anhydride to form an epoxy ester resin; and (B) 3–10% by weight of methylated urea formaldehyde resin;

wherein the binder is neutralized with a water soluble aliphatic amine and the resulting composition has a pH of about 7–8.

References Cited
UNITED STATES PATENTS

| | | | |
|---|---|---|---|
| 3,632,836 | 1/1972 | Walker | 260—830 R |
| 3,725,341 | 4/1973 | Rogers et al. | 260—47 EP |
| 3,637,590 | 1/1972 | Maycock et al. | 260—47 EP |
| 3,679,618 | 7/1972 | Lohr | 260—29.40 A |
| 3,624,013 | 11/1971 | Sekmakas et al. | 204—181 |
| 3,509,086 | 4/1970 | Rohrbacher | 260—32.8 |
| 3,272,647 | 9/1966 | Swanson et al. | 117—75 |
| 3,627,720 | 12/1971 | Hinton | 260—29.4 R |
| 3,598,775 | 8/1971 | Huggard | 204—181 |
| 3,434,952 | 3/1969 | Tsou | 204—181 |
| 3,730,926 | 5/1973 | Güldenpfennig. | 204—181 |

MELVIN GOLDSTEIN, Primary Examiner

W. C. DANISON, Jr., Assistant Examiner

U.S. Cl. X.R.

117—132 BE, 161 ZB; 260—29.2 EP, 47 EP, 834